United States Patent [19]

Fletcher

[11] Patent Number: 5,203,254
[45] Date of Patent: Apr. 20, 1993

[54] COMBINATION COOKING RACK AND PAN ASSEMBLY

[75] Inventor: Carl R. Fletcher, Kildeer, Ill.

[73] Assignee: Ensar Corporation, Wheeling, Ill.

[21] Appl. No.: 947,465

[22] Filed: Sep. 21, 1992

[51] Int. Cl.⁵ .................. A47J 37/04; A47J 43/00; A47J 43/18

[52] U.S. Cl. .................................. 99/426; 99/449; 211/181; 220/491; 220/743; 220/756; 220/912; 294/32; 294/34

[58] Field of Search ............... 99/339, 340, 426, 449, 99/450; 220/405, 491, 646, 743, 769, 756, 912; 211/181, 195, 201; 248/175; 294/32, 34

[56] References Cited

U.S. PATENT DOCUMENTS

| | | | |
|---|---|---|---|
| 629,127 | 7/1899 | Geer | 99/426 |
| 823,071 | 6/1906 | Nelson | 294/34 |
| 1,271,326 | 7/1918 | Kivlan | 99/449 |
| 2,212,207 | 8/1940 | Irwin et al. | 99/426 |
| 2,504,237 | 4/1950 | Weissbach | 99/426 |
| 2,549,709 | 4/1951 | Potts | 99/449 |
| 3,359,889 | 12/1967 | Young et al. | 99/426 |
| 4,200,040 | 4/1980 | MacRae | 211/181 X |
| 4,717,038 | 1/1988 | Anders | 220/912 |
| 4,741,262 | 5/1988 | Moncrief | 294/32 X |
| 4,852,760 | 8/1989 | Sarnoff et al. | 220/491 |

OTHER PUBLICATIONS

Two Photographs of a Reynolds Metal Foil Roasting Pan and Frame, date unknown.

*Primary Examiner*—Timothy F. Simone
*Attorney, Agent, or Firm*—Dressler, Goldsmith, Shore, Sutker & Milnamow, Ltd.

[57] ABSTRACT

A combination cooking rack and aluminum foil pan assembly. The rack comprises wire segments for supporting a food item to be cooked. The wire segments define a planar array and are disposed above the pan base. The rack includes a pair of oppositely disposed handles, including a hand grip overlying the pan rim and a clamp below the pan rim for clamping the rim therebetween. The clamp is movable to a retracted position for assembly of the pan to the cooking rack and for detaching the rack from the pan.

18 Claims, 5 Drawing Sheets

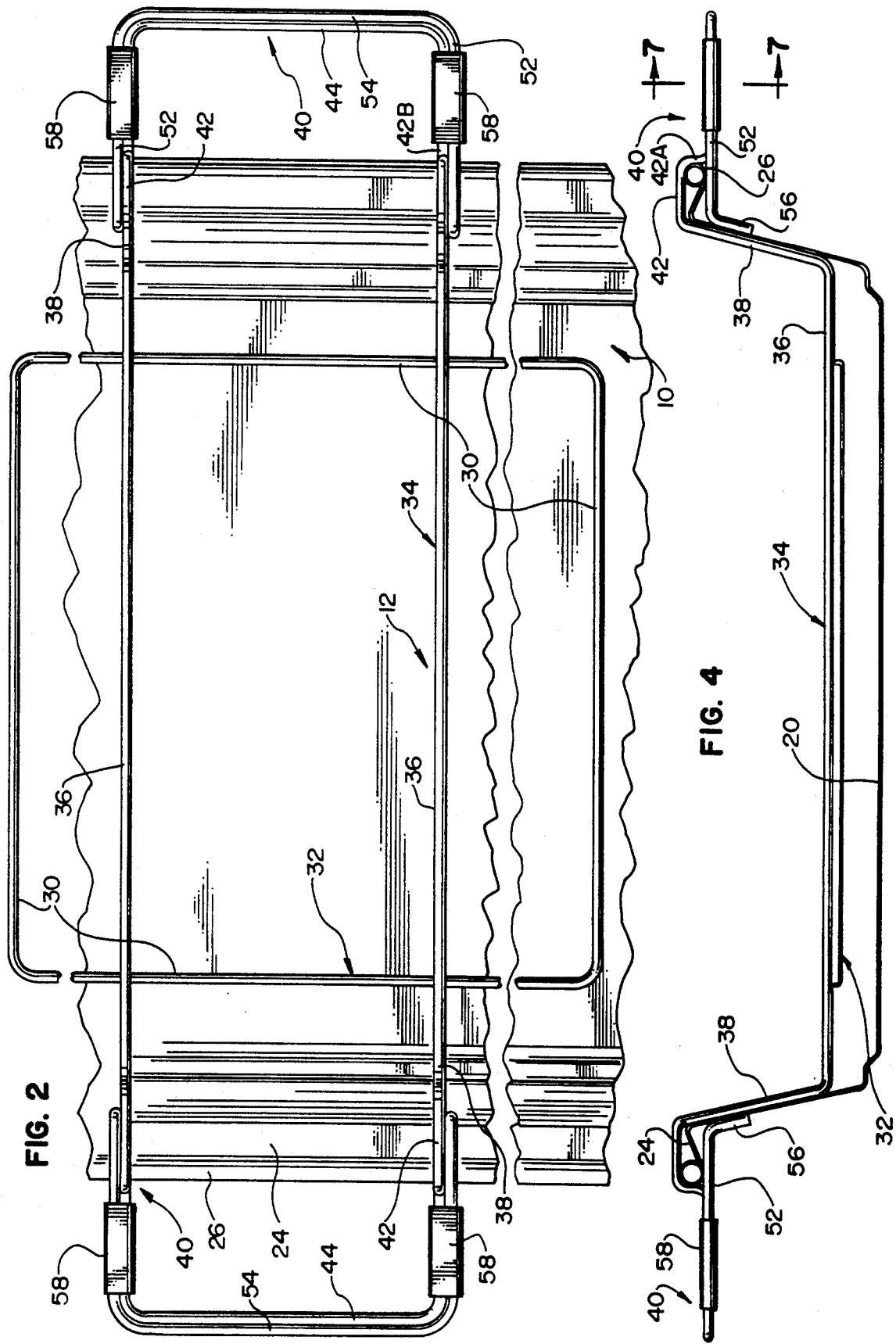

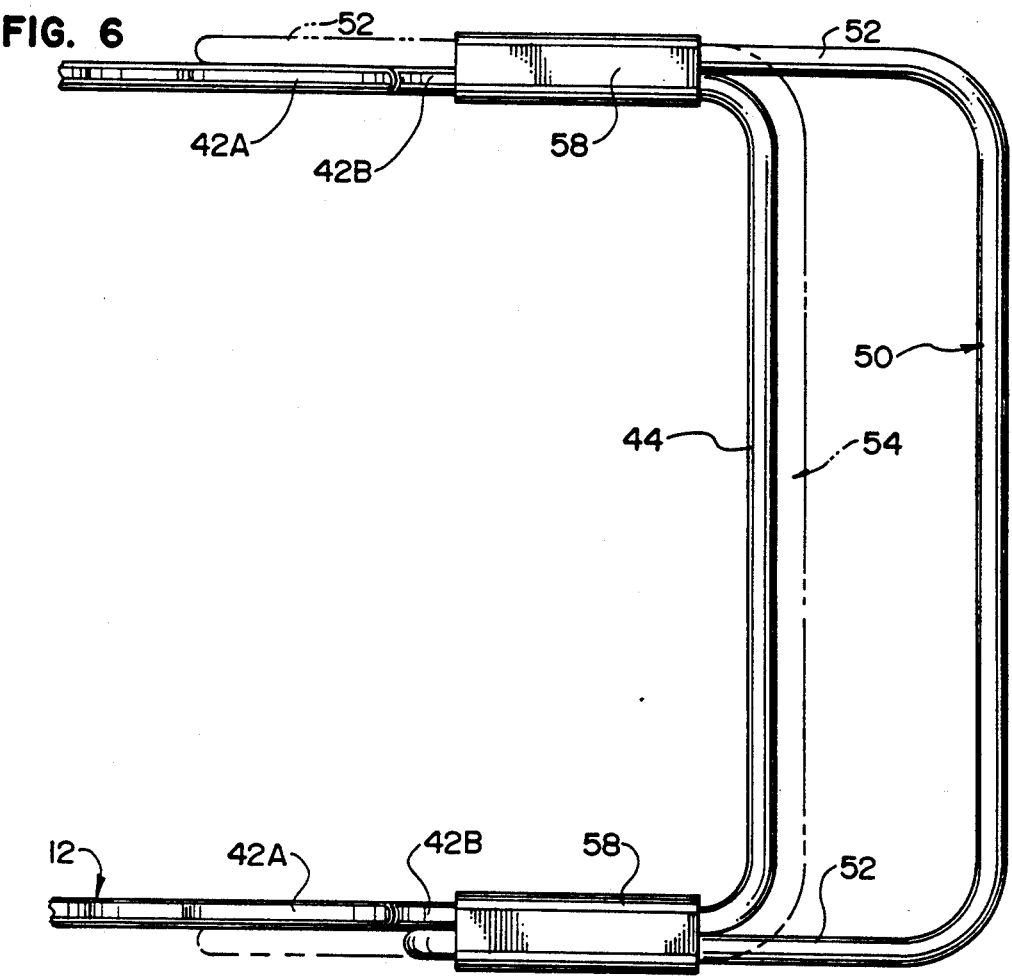
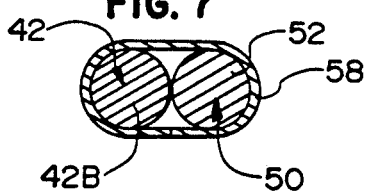
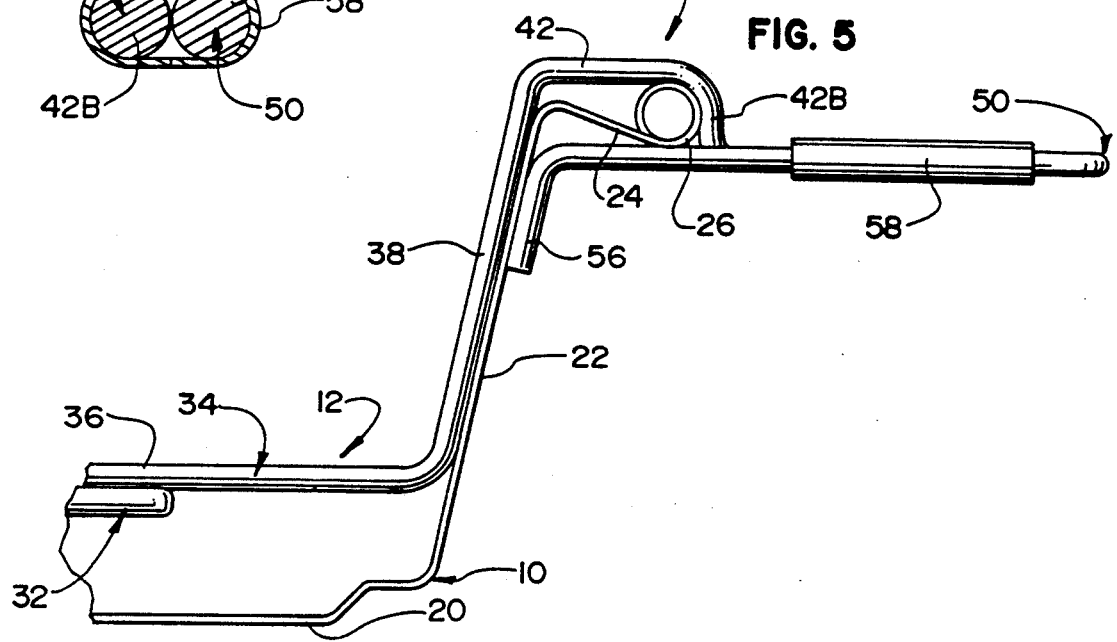

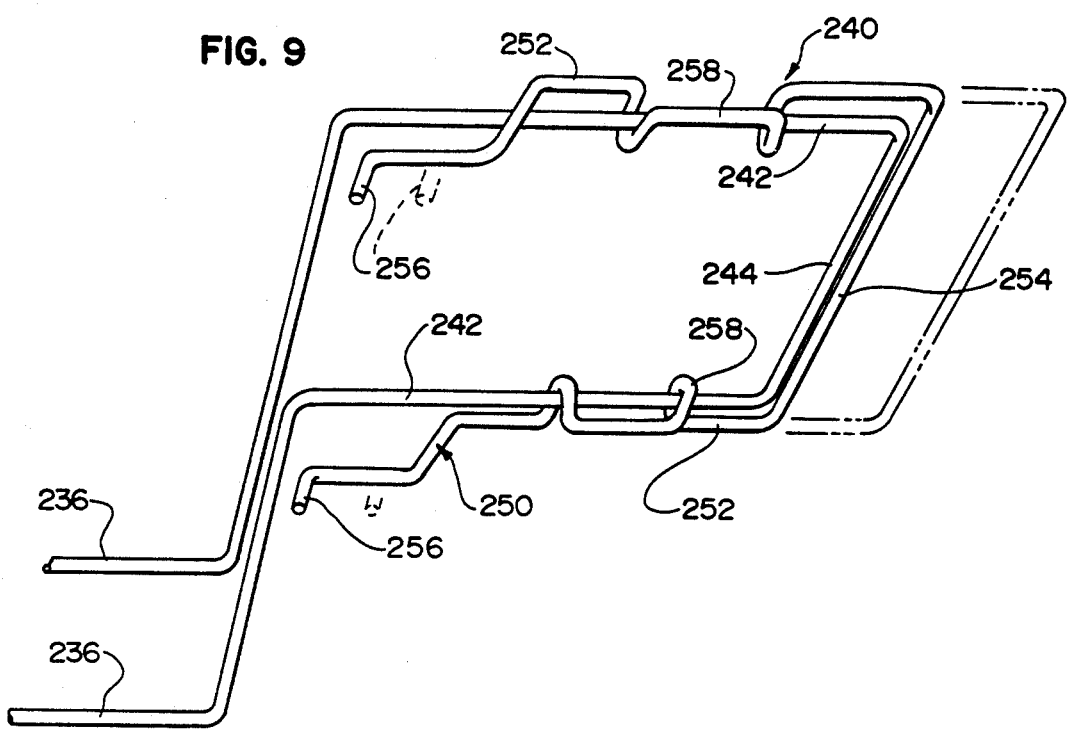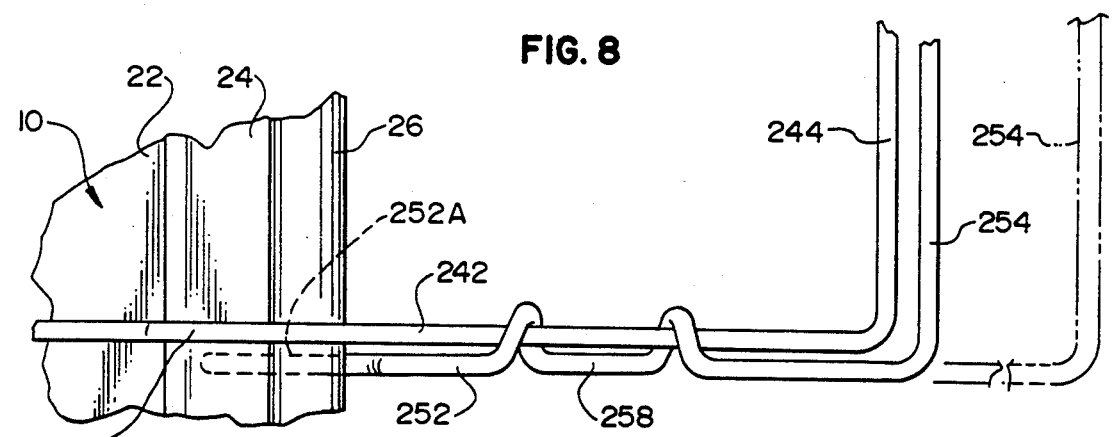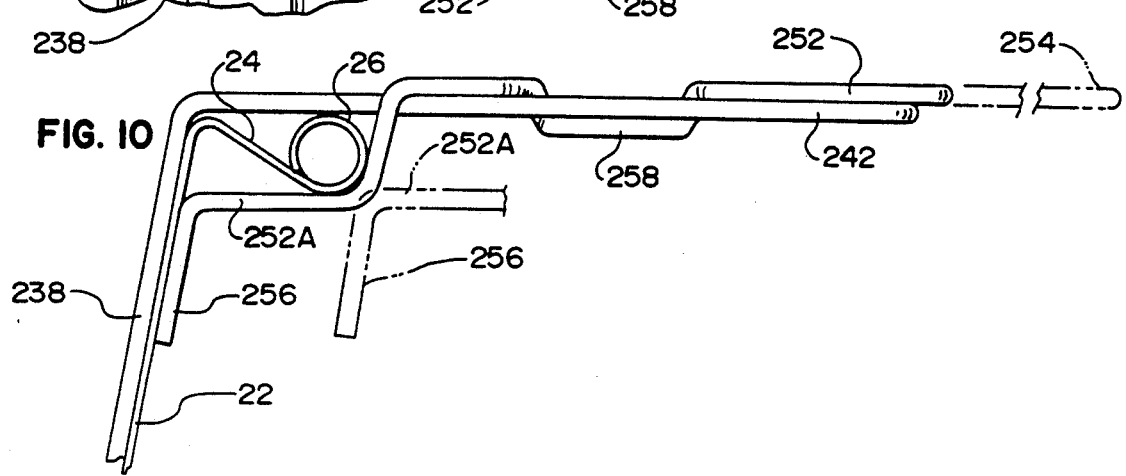

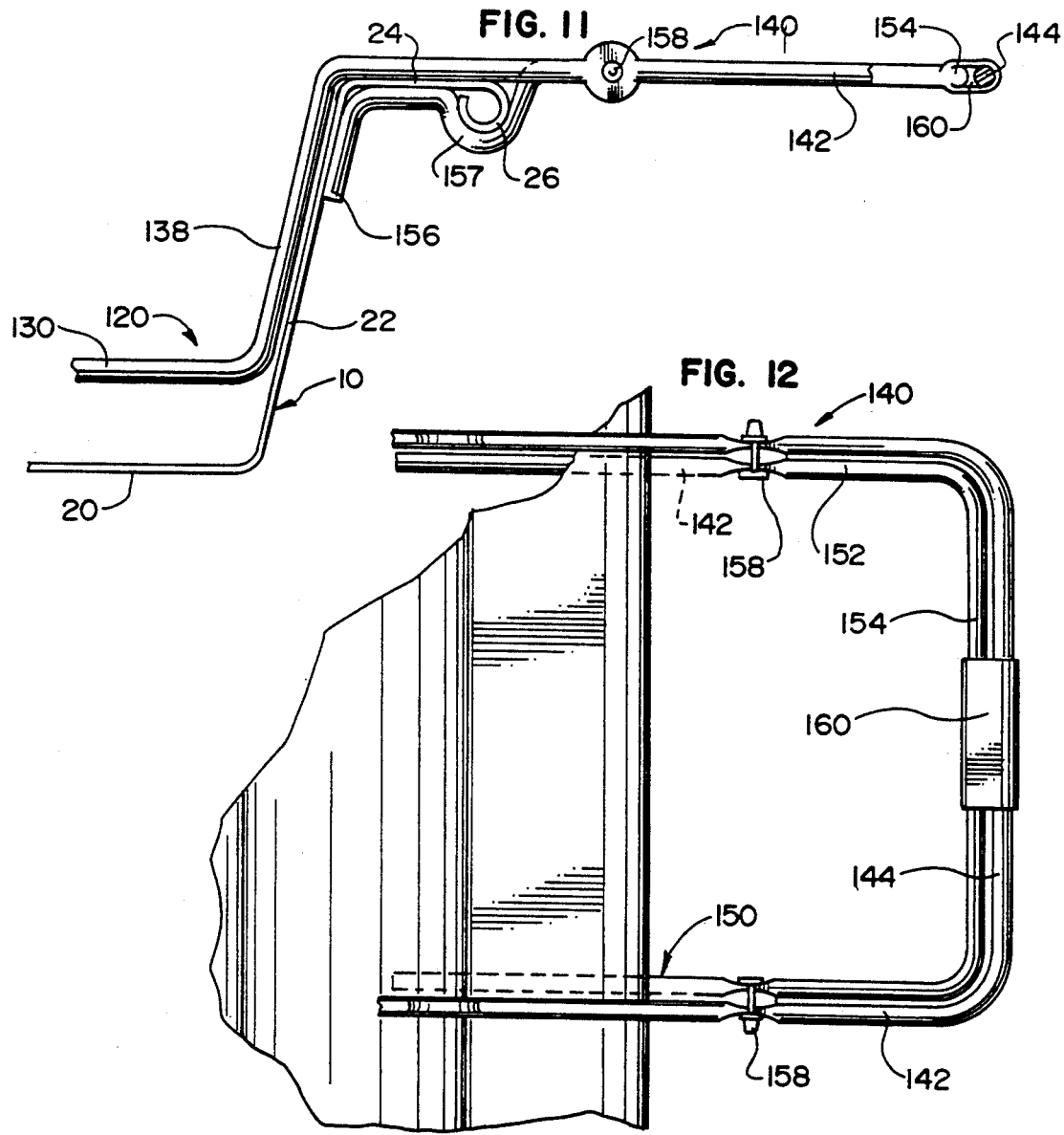

COMBINATION COOKING RACK AND PAN ASSEMBLY

BACKGROUND OF THE INVENTION

A variety of pan and support frame assemblies with handles are presently on the market. Each supports a disposable aluminum foil pan on an underlying support frame. Typically a turkey, roast or the like is positioned on the pan and then becomes partially submerged in the cooking juices. Further, the bottom of the pan itself is subjected to the forces applied by the underlying frame and to possible damage therefrom.

Typical pan arrangements with underlying support frame are illustrated in U.S. Pat. Nos. 4,852,760 and 4,717,038. In some cases the frames support the pan thereon, and in other cases the frames both support the pans and connect the pans to the frames. In all cases carrying handles are provided for transporting the supported pan from place to place.

Pans having a support grill for elevating an item to be cooked above a pan for collecting juices are also known. These serve to prevent the food to be roasted from becoming partially submerged in the juices released from the food during cooking. Such support grills typically are not attached to the pan, but instead are merely placed thereon.

It would be of advantage to provide a combination cooking rack and pan which provides the advantages of a cooking rack with the disposability of an aluminum foil pan, and one in which the user has the option of disposing of the combination or reusing the cooking rack. It would also be of further advantage to provide a combination cooking rack and pan detachably connected to each other so that the user has the option of lifting the combination (including any item placed on the rack) as a unit or of readily detaching the rack and lifting it (and any item placed thereon) and transporting such away from the pan.

SUMMARY OF THE INVENTION

In accordance with the present invention, a combination cooking rack and pan assembly is provided in which the cooking rack supports an item to be cooked thereon during cooking and suspends the pan by its rim. The pan, which desirably is stamped of aluminum foil, comprises a base, a side wall extending upwardly from the base and a peripheral rim extending outwardly from the side wall. The cooking rack desirably includes a plurality of wire segments overlying the pan base. The wire segments together define a generally planar array for directly supporting an item to be cooked thereon.

The rack further includes a pair of handle means, each secured to the planar array at opposite sides of the array. Each handle means comprises a hand grip portion and a clamping portion movable relative to the hand grip portion between a first position in which the hand grip portion and the clamping portion grip the pan rim at opposite sides, and a second position in which the pan rim is readily assembleable to the cooking rack.

In a preferred form the hand grip portion overlies the rim and the clamping portion underlies the rim and the hand grip portion is formed integrally with at least a portion of the array.

In one form the clamping portion is mounted for sliding movement on the hand grip portion between the first position in which the rim is gripped thereby and the second position in which the clamping portion is outwardly retracted beyond the rim. The sliding movement is preferably permitted by slide guides embracing portions of the hand grip portion and the clamping portion for mounting the clamping portion for sliding movement on the grip portion.

Desirably the hand grip portion includes a first hand grip and the clamping portion includes a second hand grip which lies closely adjacent the first hand grip in the first position, and which is spaced away from the first hand grip in the second position.

In another form of the invention the clamping portion is mounted for oscillation relative to the hand grip portion between the first position in which the rim is gripped therebetween and the second position in which the clamping portion is retracted from the rim. Preferably the clamping portion is pivotally mounted on the hand grip portion.

In a most preferred form the cooking rack includes wire segments lying adjacent the inside of the sidewall and the handle means includes wire segments lying closely adjacent the outside of the sidewall. The wire segments cooperate to assist in gripping the pan rim at the opposite sides. Additionally, means are provided for maintaining the pan rim and cooking rack in their assembled condition in the second position and for permitting the clamping portion to be retracted from the hand grip portion and to return it to the first position to permit detachment of the cooking rack from the pan.

Further objects, features and advantages of the present invention will become apparent from the following description and drawings.

BRIEF DESCRIPTION OF THE DRAWINGS

FIG. 2 is a plan view, partially cut away, of the cooking rack and pan assembly of FIG. 1;

FIG. 4 is a side elevational view, partially in section, of the cooking rack and pan assembly of FIG. 1;

FIG. 5 is an enlarged fragmentary view of a portion of FIG. 4;

FIG. 6 is an enlarged fragmentary view of a portion of FIG. 4 with a portion of one handle assembly retracted;

FIG. 7 is cross-sectional view taken along line 7—7 of FIG. 4;

FIG. 8 is a plan view of another embodiment of the present invention;

FIG. 9 is a perspective view of the handle assembly of FIG. 8;

FIG. 10 is a side elevational view of FIG. 8;

FIG. 11 is a side elevational view of a handle assembly of another embodiment of the present invention viewed in a manner similar to that of FIG. 4;

FIG. 12 is a plan view of FIG. 11; and

FIG. 13 is a view like that of FIG. 11, but with the handle assembly opened for removal of the pan.

DETAILED DESCRIPTION

Figure 1:
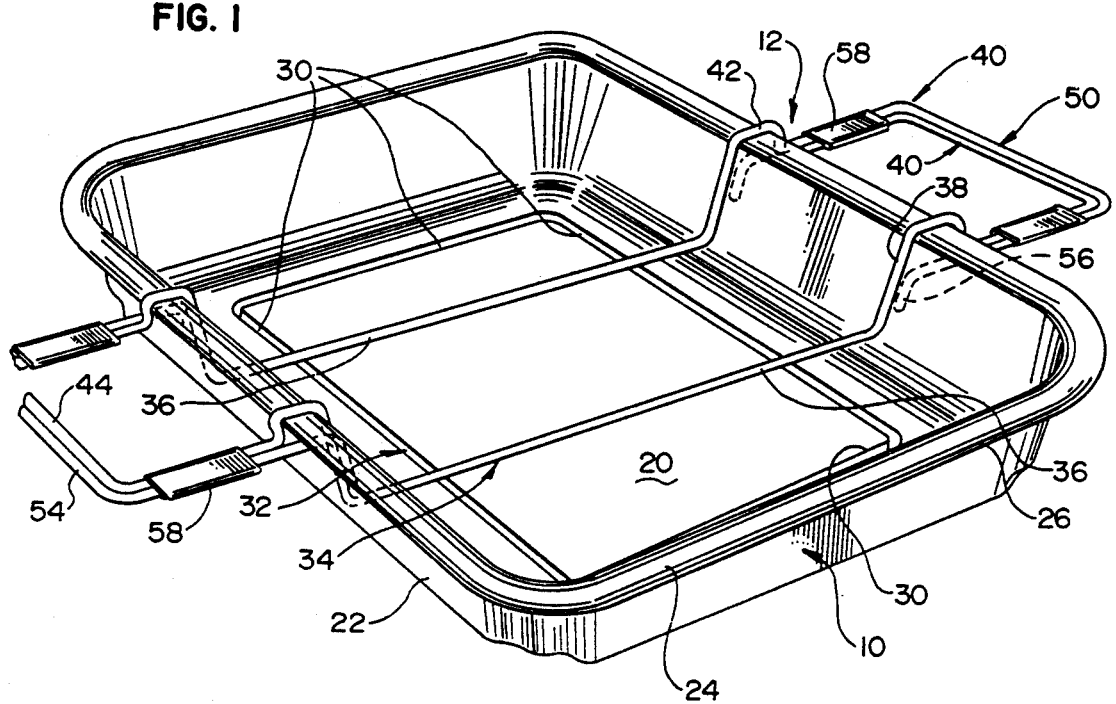
FIG. 1 is a top perspective view of a combination cooking rack and pan assembly of the present invention.
Figure 3:
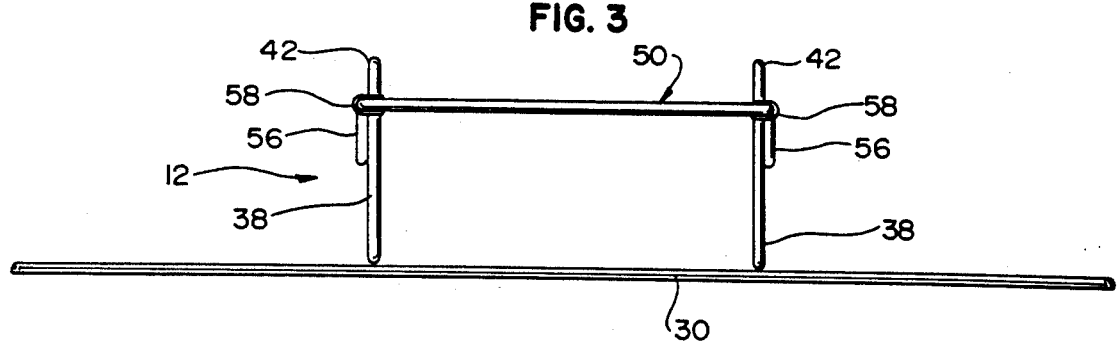
FIG. 3 is an end view of the cooking rack of FIG. 2.

Referring now to the drawings, and first to FIGS. 1 to 7, a combination aluminum foil pan and cooking rack of the present invention includes an aluminum foil pan 10 and a cooking rack 12.

Pan 10 may be rectangular as illustrated, or may be round, oval or square. Pan 10 comprises a base 20, a continuous side wall 22 comprising four side wall segments integral with the base and extending upwardly at an angle from the base and a peripheral rim 24. Rim 24 extends outwardly from the upper edge of the side wall 22 generally in a plane parallel to the base. The outer edge of the rim may be rolled to form a bead 26 as is conventional. Typically the aluminum foil may be of from about 0.004 to about 0.0075 inch in thickness.

The cooking rack 12, which may be formed of steel wire, includes a generally planar array of segments for supporting a food item to be roasted or broiled directly thereon. Thus, as seen in FIG. 2, the array of segments includes the four segments 30 of a first rectangular wire form frame portion 32. Frame portion 32 is welded or brazed to a second rectangular wire form frame portion 34 having two segments 36 which comprise additional segments of the planar array. The array is elevated above the base 20 of the pan so that juices and the like lie below the rack and the food item to be cooked supported on the rack when the rack and pan are used.

As best seen in FIGS. 4 and 5, the frame portion 34, at its opposite ends, is bent upwardly to lie closely adjacent and generally parallel to the inner opposite surfaces of the sidewall 22 to define frame segments 38. At the upper ends of frame segments 38, the rack is provided with handle means 40.

Each handle means 40 comprises a hand grip portion and a clamping portion. To that end the hand grip portion includes a segment 42 which is bent outwardly at the upper end of frame segment 38 and which is generally horizontal and overlies the rim 24. Segments 42 terminate in a first hand grip 44 which spans the ends of the segments 42. Segments 42 may extend directly rearwardly to the hand grip 44, or may further include a down-turned portion 42A and rearwardly extending portions 42B.

The clamping portion of the handle means 40 is movable relative to the hand grip portion between a first position in which the hand grip portion and the clamping portion clampingly grip the rim (as seen in FIG. 4) and a second position (as seen in FIG. 6) in which the pan rim 24 is released for ready separation from the cooking rack 12.

To that end, the clamping portion comprises a generally U-shaped wire form member 50. Wire form member 50 includes a spaced pair of arms 52 joined at one end by a second hand grip 54. The free ends 56 of the arms are down-turned and lie generally parallel to the outer surface of the adjacent sidewall 22.

The clamping portion is mounted on the hand grip portion by formed slide guides 58 which embrace adjacent parallel portions, namely portions of the arms 52 and portions of segments 42. Preferably the slide guides 58 are shaped tubular ferrules, such as of steel or aluminum, which are crimped sufficiently tightly around the adjacent parallel portions so that they frictionally restrain the parallel portions against free-sliding movement therebetween. In other words, although relative sliding movement is provided for, there is sufficient frictional resistance so that moderate force is required to force the parts of the handle means to slide relative to each other. Alternatively the ferrules may be fixed to on of the two parallel portions while permitting the other portion to slide relative to the first portion and the ferrule.

When the cooking rack 12 is assembled as described, the clamping portion is positioned as illustrated in FIG. 4. When the rack is to be joined with a pan, the rack is dropped into a pan to assume the position illustrated by FIG. 6. The clamping portions 50 are then slid inwardly from the position of FIG. 6 to that of FIG. 4 (and the dotted line position of FIG. 6) to grip the rim 24 at each side of the pan 10. In that position, the second hand grip 54 lies very closely adjacent to the first hand grip 44, and together they serve to provide a means for lifting the rack 12 and any item placed thereon and for carrying and suspending the pan 10 via the rim. By positioning them closely adjacent, they promote maintenance of the clamped relationship of the rim 24 between the grip portion and the clamping portion. The maintenance of the clamped relationship is also promoted by the positions of the frame segments 38 and free ends 56 and by the portions of the handle means 40 which surround the rim bead 26 as seen in FIGS. 4 and 5.

It will also be apparent that the clamped relationship may be temporary. Thus, after cooking, the clamping portion may be retracted so that the rack (and supported food item) may be lifted away from the pan and juices and moved to another suitable location for further processing, such as slicing, while leaving the pan and juices behind.

In the embodiment of FIGS. 8 to 10, the cooking rack may be essentially the same as that of FIGS. 1 to 7 except for the handle means and the clamping portion. As such, the part numbers used will be the same for the pan and will be parallel for the handle assembly.

As seen in FIGS. 8 to 10, the clamping portion 250 of the handle means 240 is movable relative to the hand grip portion between a first position in which the hand grip portion and the clamping portion 250 clampingly grip the rim 24 (as seen in FIG. 10) and a second position (as seen in dotted line in FIG. 10) in which a pan rim 24 is adapted to be released for ready separation from the cooking rack.

To that end, the clamping portion 250 comprises a generally U-shaped wire form member. The wire form member includes a spaced pair of arms 252 joined at one end by a second hand grip 254. The free ends 256 of the arms are down-turned and are adapted to lie generally parallel to the outer surface of the adjacent pan sidewall 22.

The clamping portion 250 is mounted on the segments 242 of the hand grip portion by formed slide guides 258 which embrace adjacent parallel portions of segments 242. The slide guides 258 take the form of wire segments formed with arms 252 to define U-shaped configurations both in plan view and in end view. Thus, they slidably receive segments 242 and extend laterally beyond segments 242 (see FIG. 8) to slidably retain segments 242. It is apparent that such slide guides may alternatively be formed in segments 242 for like cooperation with the arms of the clamping portion. The slide guides are sufficiently tight so that they frictionally restrain the parallel portions against free-sliding movement therebetween. In other words, although relative sliding movement is provided for, there is sufficient frictional resistance so that moderate force is required to force the parts of the handle means to slide relative to each other. Further, as may best be seen in FIG. 10, arms 252 may include offset segments 252A to define, with segments 242, a suitable recess or space to accommodate rim bead 26.

When the cooking rack of the embodiment of FIGS. 8 to 10 is assembled as described, the rack is adapted to be joined with a pan 10 in the same manner described regarding the embodiment of FIGS. 1-7. Thus, when the rack of FIGS. 8 to 10 is to be joined with a pan, such as a pan 10, the rack is dropped into a pan 10 to assume the position illustrated by FIG. 10. The clamping portions 250 are then slid inwardly from the dotted line position of FIG. 10 to the full line position of FIG. 10 to grip the rim 24 at each side of the pan 10. In that position, the second hand grip 254 lies very closely adjacent to the first hand grip 244, and together they serve to provide a means for lifting the rack and any item placed thereon and for carrying and suspending the pan 10 via the rim. By positioning them closely adjacent, they promote maintenance of the clamped relationship of the rim 24 between the grip portion and the clamping portion. The maintenance of the clamped relationship is also promoted by the positions of the frame segments 238 and free ends 256 and by the portions of the handle means which surround the rim bead 26 as best seen in FIG. 10.

It will also be apparent that the clamped relationship may be temporary. Thus, after cooking, the clamping portion may be retracted so that the rack (and supported food item) may be lifted away from the pan and juices and moved to another suitable location for further processing, such as slicing, while leaving the pan and juices behind.

In the embodiment of FIGS. 11-13, which may be the same in all respects as that of the embodiment of FIGS. 1-7 except for the handle means at each side, a pan 10 and a cooking rack 120 are juxtaposed in very much the same manner as that of FIGS. 1-7. Pan 10 includes a base 20, a continuous sidewall 22, a rim 24 and a rim bead 26. The cooking rack 120 includes a generally planar, horizontal array 130 of wire segments for supporting an item to be cooked. Like the array of FIGS. 1-7, array 130 is located above the base 20 of the pan so that juices may collect below the array. As such it is apparent that the rack is positioned above the pan and suspends the pan, but does not serve to support the pan thereon.

The array 130 terminates at a pair of opposite sides in upwardly angled frame segments 138 which lie closely adjacent and parallel to the side walls 22. Handle means 140 are provided adjacent the upper ends of frame segments 138.

Each handle means 140 comprises a hand grip portion and a clamping portion. Thus the hand grip portion includes a segment 142 which is bent outwardly at the upper end of frame segment 138 and which is generally horizontal and overlies the rim 24. Segments 142 terminate in a first hand grip 144 which spans the ends of segments 142.

The clamping portion of the handle means 140 is movable relative to the hand grip portion between a first position in which the hand grip portion and the clamping portion clampingly grip and restrain the rim (as seen in FIG. 11) and a second position (as seen in FIG. 13) in which the pan rim 24 is released for ready separation and removal from the cooking rack 120.

To that end, the clamping portion comprises, in plan view, a generally U-shaped wire form member 150. Wire form member 150 includes a spaced pair of arms 152 joined at one end by a second hand grip 154. The free ends 156 of the arms are down-turned and lie generally parallel to the outer surface of the adjacent sidewall 22. As seen in side elevation, FIGS. 11 and 13 the arms 152 define a loop 157 adjacent the free ends 156 which receives the rim bead 26 which tends, as seen in FIG. 11, to prevent accidental withdrawal of the rim from the handle means.

The clamping portion is mounted for oscillation on the hand grip portion by pivot pins 158 which extend through flattened portions of the arms 152 and segments 142.

Thus, when the cooking rack 120 is assembled as described, the clamping portion is positioned generally as illustrated in FIG. 13. When the rack 120 is to be joined with a pan, the rack is dropped into a pan to assume the position illustrated in FIG. 13. The clamping portions 150 are then oscillated inwardly from the position of FIG. 13 to that of FIG. 11 to grip the rim at each side of the pan. In that position, the second hand grip 154 lies very closely adjacent to the first hand grip 144, and together they serve to provide a means for lifting the rack and for carrying and suspending the pan 10 via the rim 24. By positioning them closely adjacent, they promote maintenance of the clamped relationship of the rim between the grip portion and the clamping portion. The maintenance of the clamped relationship is also promoted by the positions of the frame segments 138 and free ends 156 and by the portions of the wires which surround the rim bead 26 as seen in FIG. 11. A removable tape wrap 160 may be used to assure the maintenance of the close adjacency of the first and second hand grips 144, 154 during use, and to permit later detachment of the rack (and food item supported thereon) from the pan. Alternatively, a ferrule or other means for holding the grips against separation may also be used.

From the foregoing, it will be apparent to those skilled in the art that other equivalent structures may be made without departing from the spirit and scope of the present invention. Accordingly, the invention is not intended to be limited except insofar as may be necessary in light of the appended claims.

What is claimed is:

1. A combination cooking rack and pan assembly, and wherein said cooking rack supports an item to be cooked thereon during cooking and suspends said pan by its rim,
   said pan comprising a base, a side wall extending upwardly from the base and a peripheral rim extending outwardly from the side wall,
   said cooking rack comprising
   a plurality of wire segments overlying said pan base and together defining a generally planar array for directly supporting an item to be cooked thereon,
   a pair of handle means, each secured to said planar array at opposite sides of said array,
   each said handle means comprising a hand grip portion and a clamping portion movable relative to said hand grip portion between a first position in which said hand grip portion and said clamping portion grip said pan rim at said opposite sides, and a second position in which said pan rim is readily assembleable to said cooking rack.

2. A combination cooking rack and pan assembly in accordance with claim 1, and wherein said hand grip portion overlies said rim and said clamping portion underlies said rim.

3. A combination cooking rack and pan assembly in accordance with claim 2, and wherein said hand grip portion is formed integrally with at least a portion of said array.

4. A combination cooking rack and pan assembly in accordance with claim 2, and wherein said clamping portion is mounted for sliding movement on said hand grip portion between said first position in which the rim is gripped thereby and said second position in which said clamping portion is outwardly retracted beyond said rim.

5. A combination cooking rack and pan assembly in accordance with claim 4, and wherein said handle means further comprises slide guides embracing portions of at least one of said hand grip portion and said clamping portion for mounting said clamping portion for sliding movement on said hand grip portion.

6. A combination cooking rack and pan assembly in accordance with claim 2, and wherein said hand grip portion includes a first hand grip and said clamping portion includes a second hand grip which lies closely adjacent said first hand grip in said first position, and which is spaced away from said first hand grip in said second position.

7. A combination cooking rack and pan assembly in accordance with claim 2, and wherein said clamping portion is mounted for oscillation relative to said hand grip portion between said first position in which said rim is gripped therebetween and said second position in which said clamping portion is retracted from said rim.

8. A combination cooking rack and pan assembly in accordance with claim 7, and wherein said clamping portion is pivotally mounted on said hand grip portion.

9. A combination cooking rack and pan assembly in accordance with claim 1, and wherein said cooking rack includes wire segments lying adjacent the inside of said sidewall and said handle means includes wire segments lying closely adjacent the outside of said sidewall, said wire segments cooperating to assist in gripping said pan rim at said opposite sides.

10. A combination cooking rack and pan assembly in accordance with claim 1, and wherein means are provided for maintaining said pan rim and cooking rack in said assembled condition in said second portion and for permitting said clamping portion to be retracted from said hand grip portion to permit detachment of said cooking rack from said pan.

11. A combination cooking rack and pan assembly in accordance with claim 10, and wherein said pan is an aluminum foil pan and said hand grip portion overlies said rim and said clamping portion underlies said rim.

12. A cooking rack for supporting an item to be cooked thereon during cooking and for suspending by its rim a pan comprising a base, a side wall extending upwardly from the base and a peripheral rim extending outwardly from the side wall, said cooking rack comprising
a plurality of wire segments for overlying a pan base and together defining a generally planar array for directly supporting an item to be cooked thereon,
a pair of handle means, each secured to said planar array at opposite sides of said array,
each said handle means comprising a hand grip portion and a clamping portion movable relative to said hand grip portion between a first position in which said hand grip portion and said clamping portion are adapted to grip a pan rim at said opposite sides, and a second position in which a pan rim is readily assembleable to said cooking rack.

13. A cooking rack in accordance with claim 12, and wherein said hand grip portion is adapted to overlie said rim and said clamping portion is adapted to underlie said rim.

14. A cooking rack in accordance with claim 13, and wherein said hand grip portion is formed integrally with at least a portion of said array.

15. A cooking rack in accordance with claim 13, and wherein said clamping portion is mounted for sliding movement on said hand grip portion between said first position and said second position in which said clamping portion is outwardly retracted.

16. A cooking rack in accordance with claim 13, and wherein said hand grip portion includes a first hand grip and said clamping portion includes a second hand grip which lies closely adjacent said first hand grip in said first position, and which is spaced away from said first hand grip in said second position.

17. A cooking rack in accordance with claim 13, and wherein said clamping portion is mounted for oscillation relative to said hand grip portion between said first position and said second position in which said clamping portion is retracted.

18. A cooking rack in accordance with claim 12, and wherein said cooking rack includes wire segments adapted to lie adjacent the inside of said sidewall and said handle means includes wire segments adapted to lie closely adjacent the outside of said sidewall, said wire segments being adapted to assist in gripping said pan rim at said opposite sides.

* * * * *